J. A. STONE.
SNAPPING ROLLS FOR CORN HARVESTERS.
APPLICATION FILED JULY 20, 1910.
992,287.
Patented May 16, 1911.
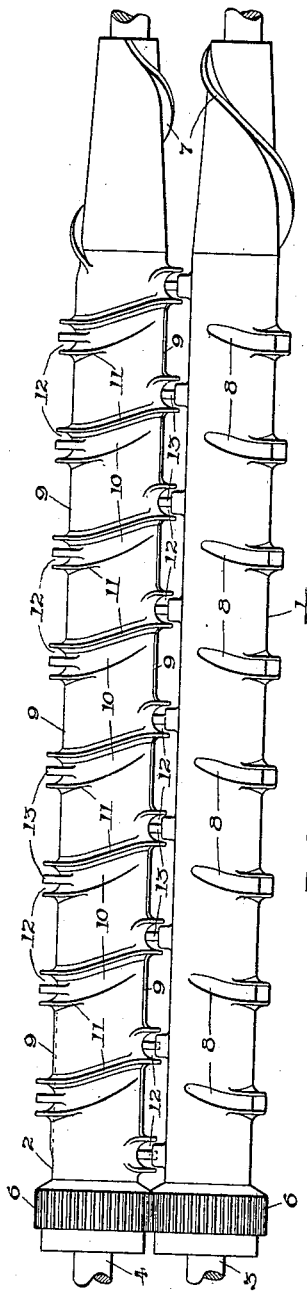
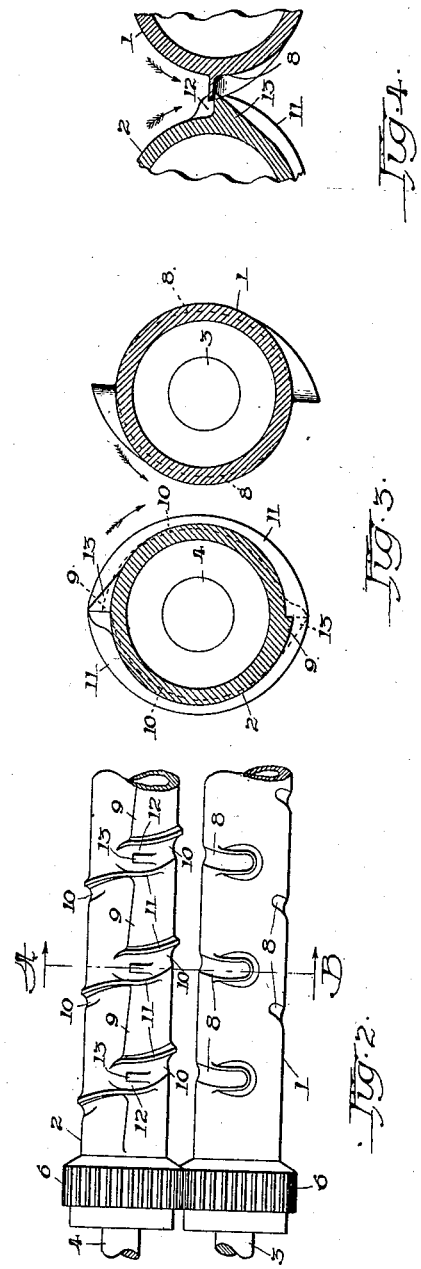

UNITED STATES PATENT OFFICE.

JOHN A. STONE, OF CHICAGO, ILLINOIS, ASSIGNOR TO INTERNATIONAL HARVESTER COMPANY, A CORPORATION OF NEW JERSEY.

SNAPPING-ROLLS FOR CORN-HARVESTERS.

992,287.  Specification of Letters Patent.  Patented May 16, 1911.

Application filed July 20, 1910. Serial No. 572,825.

*To all whom it may concern:*

Be it known that I, JOHN A. STONE, a citizen of the United States, residing at Chicago, in the county of Cook and State of Illinois, have invented certain new and useful Improvements in Snapping-Rolls for Corn-Harvesters, of which the following is a specification.

My invention relates to snapping rolls designed to sever the ears of corn from the stalk, and consists in a novel construction of the rolls and stalk advancing means whereby a high degree of efficiency is attained in the operation of the mechanism; the object of my invention being to provide a mechanism that will sever the ears from the stalks in a positive manner and with little consumption of power. I attain these objects by means of the mechanism illustrated by the accompanying drawing, in which—

Figure 1 is a top plan view of a pair of snapping rolls having my invention forming a part thereof; Fig. 2 represents a portion of the rolls shown in Fig. 1 when given a partial rotation upon their axes; Fig. 3 is an enlarged cross section of Fig. 2 along line A—B; and Fig. 4 is a detached detail illustrating the joint action of the rolls in severing an ear from the stalk.

The same reference characters designate like parts through the several views.

1 and 2 represent right and left hand rolls secured to shafts 3 and 4, respectively, and having intermeshing gear members 6 adapted to rotate them in opposite directions, the rolls being tapered at their receiving ends for the purpose of facilitating the entrance of stalks between them, the tapered portions of the rolls being provided with oppositely disposed spirally arranged ribs 7 operative to cause the stalks to move rearward between them.

The body of the roll 1 is in the shape of a right cylinder throughout its length, and provided with a double series of spirally arranged grooves 8, having a rearward lead around the periphery of the roll in a direction opposite to that in which it rotates, the grooves of one series alternating with those of the other, the separate series being disposed upon opposite sides of the roll, each individual groove of both series terminating at its rear end in a pocket having side walls gradually raised above the periphery of the roll and eccentric to its axis, as shown in Fig. 3.

The body portion of roll 2 is not wholly cylindrical, the portions 9 of the periphery thereof gradually receding from the axis in a direction opposite to that of the rotation of the roll upon opposite sides thereof, and terminating in lines substantially parallel with the axis. There is a double series of spirally arranged shallow grooves 10 upon the opposite halves of its periphery that lead rearward in a direction opposite to that of rotation of the roll and terminate at the parts of the periphery thereof most remote from its axis, the grooves of one series alternating with those of the other, and each series registering with the corresponding series upon the companion roll 1 as the two rolls are rotated in opposite directions.

11 represents ribs raised above the periphery of the roll and arranged along the sides of the grooves toward the stalk receiving end of the roll and having their terminals overlapping in a manner forming short channels 12 with open ends at the ends of the grooves leading toward the opposite end of the roll, and 13 represents teeth projecting outward from the bottom of the channels intermediate their terminal walls, the teeth being adapted to enter the pockets at the terminals of the grooves in the companion roll and the walls of the channels to overlap those of the pockets, as shown in Fig. 1.

In the operation of the mechanism the stalks are received between the tapered ends of the rolls and are drawn downward by means of rolls rotating in opposite directions, and rearward by means of the spirally arranged ribs and grooves, the bodies of the rolls being spaced apart in a manner producing an aggressive action of the rolls when in contact with the body of the stalks, resulting in a consequent saving of power, and as the ear stems are engaged by the grooves in the rolls they are carried downward thereby until the butt of the ear is reached and a complete severance of the ear from its stem is obtained when the butt has traversed the opposing grooves and contacts with the terminal tooth that coöperates with the non-cylindrical part of the roll in an aggressive manner to pinch the stem from the ear.

What I claim as my invention, and desire to secure by Letters Patent, is:

1. Snapping rolls for corn harvesters rotatable in opposite directions, each roll having a double series of spirally arranged grooves upon opposite portions of its periphery in alternating relation, each groove having a rearward lead in a direction opposite to that in which the roll rotates, the series upon one roll registering with those of the opposing series on the other roll when the rolls are rotated, the grooves upon one of the rolls terminating in open ended channels and those of the other in pockets formed by flanges that are received by said channels.

2. Snapping rolls for corn harvesters rotatable in opposite directions, each roll having a double series of spirally arranged grooves upon opposite portions of its periphery in alternating relation, the grooves of each series terminating in lines substantially parallel with the axis of the roll, each groove having a rearward lead in a direction opposite to that in which the roll rotates, and the series upon one roll registering with those of the opposing series on the other roll when the rolls are rotated, the grooves upon one of the rolls terminating in open ended channels and those upon the other in pockets formed by flanges that are received by said channels, said channels and pockets being raised above the periphery of the rolls.

3. Snapping rolls for corn harvesters rotatable in opposite directions, each roll having a double series of spirally arranged grooves upon opposite portions of its periphery in alternating relation, the grooves of each series terminating in lines substantially parallel with the axis of the roll, each groove having a rearward lead in a direction opposite to that in which the roll rotates, and the series upon one roll registering with those of the opposite series upon the other roll when the rolls are rotated, the grooves upon one of the rolls terminating in open ended channels, and those upon the other in pockets formed by flanges, said channels having stem pinching teeth intermediate their walls that are received by said pockets when the rolls are rotated.

4. Snapping rolls for corn harvesters rotatable in opposite directions, one of said rolls having its body cylindrical with parallel sides, the companion roll having portions of its periphery gradually receding from its axis in a direction opposite to that of the rotation of said roll upon the opposite side thereof, the cylindrical roll having a double series of spirally arranged grooves upon opposite portions of its periphery in alternating relation, said grooves having a rearward lead in a direction opposite to that of the rotation of the rolls, each of said grooves terminating in a pocket formed by flanges that are raised above the periphery of the roll, the companion roll having a corresponding double series of spirally arranged grooves upon opposite sides thereof in alternating relation and having a rearward lead in an opposite direction to that of the rotation of the roll and terminating in open ended channels formed by flanges raised above the periphery of the roll, the series of grooves upon one roll registering with those of the other when the rolls are rotated, the pockets of one series being received by the channels forming part of the opposing series.

5. Snapping rolls for corn harvesters rotatable in opposite directions, one of said rolls having its body cylindrical with parallel sides, the companion roll having portions of its periphery gradually receding from its axis upon opposite sides thereof in a direction opposite to that of the rotation of the roll, said enlarged portions terminating in lines substantially parallel with the axis of the rolls, the cylindrical roll having a double series of spirally arranged grooves upon opposite portions of its periphery in alternating relation, said grooves having a rearward lead in a direction opposite to that of the rotation of the roll, each of said grooves terminating in a pocket formed by flanges that are raised above the periphery of the roll, the companion roll having a corresponding double series of spirally arranged grooves upon opposite sides thereof in alternating relation, said grooves having a rearward lead in a direction opposite to that of the rotation of the roll and terminating in open ended channels formed by flanges that are raised above the periphery of the roll, the channel terminals being substantially coincident with the terminal line of the enlarged portions of the roll, the series of grooves upon one roll registering with those of the other when the rolls are rotated, and the pockets of one series being received by the channels forming part of the opposing series.

6. Snapping rolls for corn harvesters rotatable in opposite directions, each roll having a double series of spirally arranged grooves upon opposite portions of its periphery in alternating relation, each groove having a rearward lead in a direction opposite to that in which the roll rotates, the grooves upon one roll registering with those of the opposing series upon the other roll when the rolls are rotated, the grooves upon one of the rolls terminating in pockets formed by flanges raised above the periphery of the roll, and those upon the companion roll having ribs raised above the periphery thereof and arranged along the sides of the grooves toward the stalk receiving end thereof.

7. Snapping rolls for corn harvesters rotatable in opposite directions, each roll having a double series of spirally arranged grooves upon opposite portions of its periphery in alternating relation, each groove having a rearward lead in a direction opposite to that in which the roll rotates, the grooves upon one roll registering with those of the opposing series when the rolls are rotated, the grooves upon one of the rolls terminating in pockets raised above the periphery of the roll and those upon the companion roll having ribs raised above the periphery thereof and arranged along the sides of the grooves toward the stalk receiving end thereof and having their terminals overlapping in a manner forming short open ended channels at the ends of the grooves leading toward the opposite ends of the roll, and stem pinching teeth projecting outward from the bottom of the channel intermediate their terminal walls.

JOHN A. STONE.

Witnesses:
EDW. J. TEUFEL,
ROLAND HILL.

Copies of this patent may be obtained for five cents each, by addressing the "Commissioner of Patents, Washington, D. C."